United States Patent [19]

Gaddis

[11] 4,217,145

[45] Aug. 12, 1980

[54] PROCESS FOR ADMIXING POLYMER EMULSIONS WITH WATER TO PRODUCE HIGHLY VISCOUS LIQUIDS

[76] Inventor: Preston G. Gaddis, 301 N. Quapaw, Bartlesville, Okla. 74003

[21] Appl. No.: 33,510

[22] Filed: Apr. 26, 1979

Related U.S. Application Data

[63] Continuation of Ser. No. 758,705, Jan. 12, 1977, abandoned.

[51] Int. Cl.² .................... C08L 1/08; C08L 5/00; C08L 33/26
[52] U.S. Cl. ................ 106/170; 106/197 C; 106/208; 260/29.6 H; 260/29.6 PT
[58] Field of Search ............ 106/170, 197 C, 208; 252/320; 260/29.6 H, 29.6 PT, 29.6 MH

[56] References Cited

U.S. PATENT DOCUMENTS

| | | | |
|---|---|---|---|
| 2,992,188 | 7/1961 | Miller et al. | 106/197 C |
| 3,361,537 | 1/1968 | Ferrante | 23/283 |
| 3,559,959 | 2/1971 | Davis et al. | 259/23 |
| 3,560,430 | 2/1971 | Meyer et al. | 260/37 N |
| 3,599,938 | 8/1971 | Anders et al. | 259/7 |
| 3,612,488 | 10/1971 | Bartel et al. | 259/8 |
| 3,704,863 | 12/1972 | Meyer et al. | 259/8 |
| 3,717,330 | 2/1973 | Pinney | 259/6 |
| 3,734,873 | 5/1973 | Anderson et al. | 260/29.6 HN |
| 3,852,234 | 12/1974 | Venema | 260/29.6 H |
| 4,051,065 | 9/1977 | Venema | 260/29.6 H |

*Primary Examiner*—Harold D. Anderson
*Attorney, Agent, or Firm*—Richards, Harris & Medlock

[57] ABSTRACT

Highly viscous liquids are formed by intimately admixing water and polymer emulsions by charging the polymer emulsion and water through a restricting zone into a turbulent zone to promote relatively instantaneous and intimate contact between the water molecules and polymer molecules so that the polymer can be dissolved in the water, and immediately withdrawing the water-polymer mixture from the turbulent zone.

8 Claims, 1 Drawing Figure

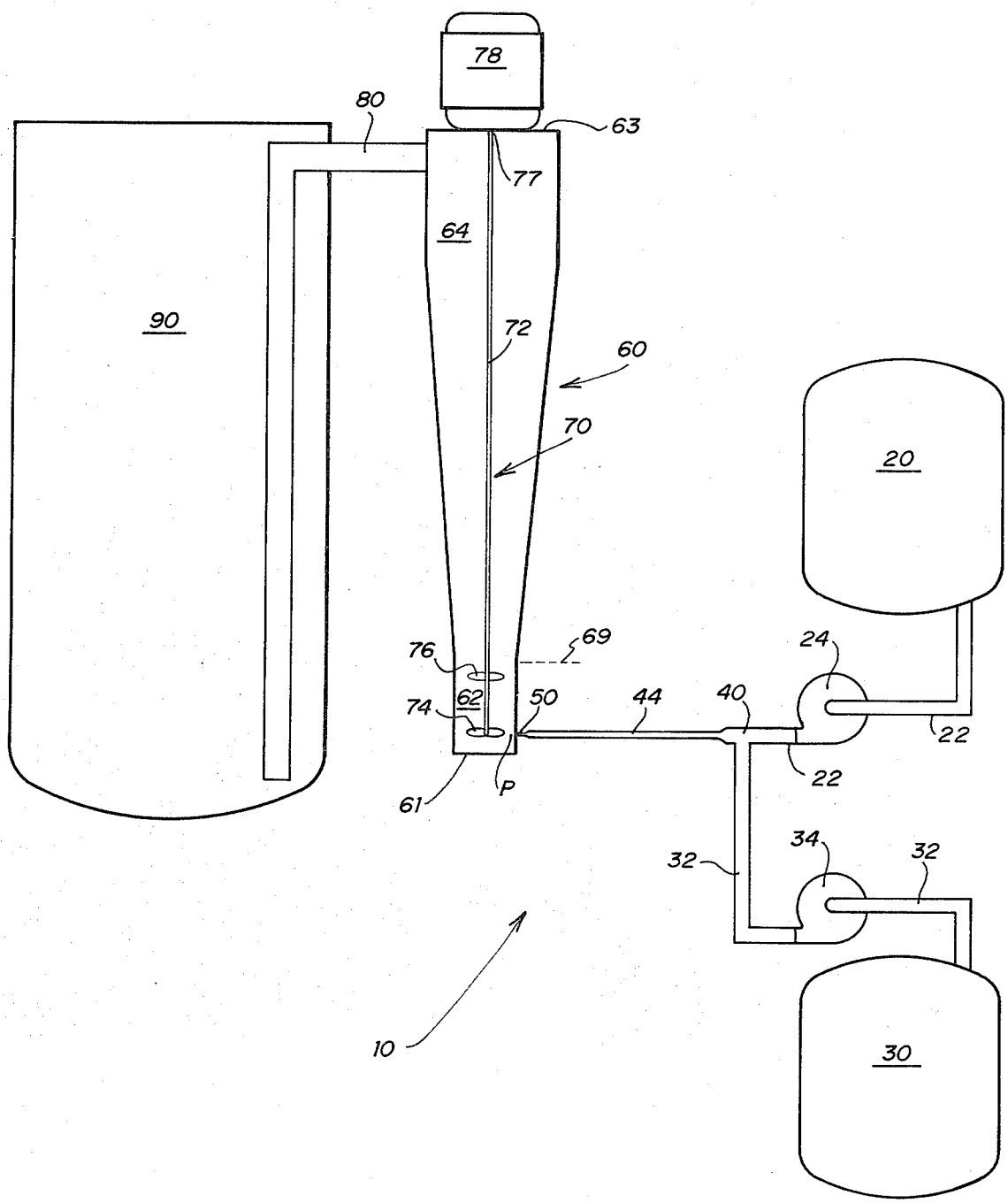

PROCESS FOR ADMIXING POLYMER EMULSIONS WITH WATER TO PRODUCE HIGHLY VISCOUS LIQUIDS

This is a continuation of application Ser. No. 758,705 filed Jan. 12, 1977, and now abandoned.

BACKGROUND OF THE INVENTION

This invention relates to the mixture of polymer emulsions with water, and more particularly, to a process for intimately admixing polymer emulsions and water to form highly viscous liquids.

In forming highly viscous liquids from polymer emulsions and water, it is important to mix the polymers with the water in such a manner that the viscosity of the final liquid product is as high as possible. It is generally believed that a water-polymer mixture becomes less viscous if the polymer chains are severed during the mixing process. Thus, it is believed to be advantageous to dissolve the polymer in the water without deleteriously affecting the polymer chains. Processes known in the prior art have been unable to produce, in a relatively short time, highly viscous liquids from the admixture of polymer emulsions and water. The present invention provides a suitable process in which polymer emulsions are admixed with water and highly viscous liquids are formed very quickly.

SUMMARY OF THE INVENTION

Highly viscous liquids are formed by intimately admixing water and polymer emulsions by charging the polymer emulsion and water through a restricting zone into a turbulent zone to promote relatively instantaneous and intimate contact between the water molecules and polymer molecules so that the polymer can be dissolved in the water, and immediately withdrawing the water-polymer mixture from the turbulent zone.

DESCRIPTION OF THE DRAWINGS

For a more complete understanding of the present invention and for further objects and advantages thereof, reference may now be had to the following description taken in conjunction with the accompanying drawing in which:

FIG. 1 is a schematic view of equipment which can be used to practice the present invention.

DETAILED DESCRIPTION OF THE INVENTION

The process of the present invention may be practiced by a mixing device generally designated by reference numeral 10. Polymer mixer 10 provides suitable apparatus for admixing water soluble, polymer emulsions with water to form highly viscous liquids.

Polymer mixer 10 includes a polymer storage tank 20 capable of storing a relatively large volume of a polymer emulsion. The term "polymer emulsion" is used in the art to describe commercially available mixtures of a polymer, a hydrocarbon, water and often a detergent. As an example, polymer emulsions commercially available include polymer emulsion No. 677 marketed by Nalco Chemical Company and polymer emulsion No. 1202 marketed by American Cyanamid Corporation. The polymer material is generally a high molecular weight compound that is soluble in water, as for example a polyacrylamide polymer. Usually, only one polymer is utilized in each emulsion to be used in the present process, but it is within the scope of the invention to use more than one polymer to form a multiple polymer liquid product. Examples of the polymer material which may be used in the process include liquid polyacrylamide, carboxymethylcellulose and guar gum, but the process has been found particularly useful in forming highly viscous liquids from the admixture of water with the liquid polyacrylamide emulsion, commercially marketed by Nalco Chemical Company as its No. 677 polymer emulsion.

The present process is suitable for use in either a single or double component system. A double component polymer emulsion contains at least a polymer, water and a hydrocarbon such as kerosene to prevent premature admixture between the polymer and water. In the forming of a highly viscous liquid the hydrocarbon may be removed from the polymer by addition of a detergent. When the detergent is provided in the commercial mixture, a single component system exists. However, as noted above the detergent may be later admixed with the polymer to form a hydrocarbon-water-detergent emulsion.

The amount of the polymer constituent in the commercial mixture which is charged to polymer storage tank 20 may widely vary, but usually the polymer material accounts for from about 10 to about 50 volume percent, the detergent ranges from about ½ to about 10 volume percent, the hydrocarbon accounts for about 33 volume percent, and water comprises the balance. Thus, constituents in a typical polymer storage tank 20 may include one or more polymers, water, a hydrocarbon for inhibiting premature admixture of the polymer material with water, and, optionally, a detergent. Typically, the polymer emulsion in tank 20 is mixed by internal blades to achieve a homogeneous state and has a viscosity of between about 50 and 300 CPS measured by a Brookfield LUF Viscosimeter.

As an example of one procedure of carrying out the invention, reference is made to FIG. 1.

The polymer emulsion in polymer storage tank 20 is transferred by a pump 24 through a line 22 to a mixing zone for mixing with water. Pump 24 may be any type pump, such as a Model 1000 Gaco pump, commercially marketed by Gaco Manufacturing Company of Bartlesville, Okla. Pump 24 should have a capacity to pump the polymer emulsion material through line 22 at a pressure between about fifteen to about three hundred pounds per square inch, although a pressure between about seventy to about one hundred pounds per square inch is normally sufficient. The diameter of line 22 is not critical, but in the preferred embodiment, a one inch diameter line with a ⅛ inch wall is utilized.

Polymer feeder 10 also includes a water storage tank 30, providing a storage area for a large volume of water used for mixing with the polymer material. It is to be understood that highly purified water is not critical to the production of highly viscous liquids, but the water should be clean and neutral. It is envisioned within the scope of this invention that tap water may be utilized. Water stored in water storage tank 30 is transferred under pressure by a pump 30 through a line 32 to a mixing zone for mixing with the polymer emulsion material. In the preferred embodiment, a Model 2000 Gaco Pump was utilized for pumping the water through line 32. In the double component system the detergent may be admixed with the water in water storage tank 30 or admixed with the water by pumping it into line 32 for a detergent.

The polymer emulsion and water are pumped simultaneously through lines 22 and 32, respectively, and initially contact one another within a tee 40 which integrates lines 22 and 32 with a conduit 44. Generally, the water is pumped into tee 40 at a much greater rate than the polymer emulsion so that the polymer emulsion comprises from about 1/10 to about 10 percent of the total volume of the polymer-water mixture. Consequently, the ratio of polymer emulsion to water line determines the volume percent of polymer in the resulting liquid.

The mixture is then charged through a restricting zone, defined by orifice 50, into a turbulent zone, defined by a lower region 62 of a mixing vessel 60. Orifice 50 is positioned proximate the side of mixing vessel 60. In forming a highly viscous liquid, it has been found advantageous to restrict the cross-sectional area of flow of the mixture before it is charged into the turbulent zone. The particular diameter of the orifice 50 depends to some extent upon the volume of liquid desired to be produced during a given time. Thus, when larger volumes of liquid are required, an orifice having a larger diameter is utilized. It has been found that when 50 gallons per hour of liquid need be produced, an orifice having a 1/16 inch diameter may, for example, be used. However, when a volume of 1,000 gallons per hour is desired, an orifice having a diameter of ½ inch is typically used. Thus, the diameter of orifice 50 ranges between about 1/16 inch to about ½ inch, but it is within the scope of this invention to use orifices having larger or smaller diameters depending upon the volume of liquid desired over a given time period.

The mixture should be charged through the restricting zone at a relatively high pressure created by pumps 24 and 34. It has been found advantageous to maintain the pressure of the mixture within the restricting zone between about fifteen to about three hundred pounds per square inch, although a pressure between about seventy to about one hundred pounds per square inch is normally sufficient.

Vessel 60 of polymer mixer 10 provides an environment for transformation of the water-polymer mixture having low viscosity into a highly viscous liquid within a relatively short time. Vessel 60 is a long, generally cylindrical vessel which in the preferred embodiment, is shaped like an inverted cone. Traveling from bottom to top, vessel 60 has a progressively increasing circumference and includes a lower region 62 defining the turbulent zone which extends from base 61 to a point 69. Vessel 60 also has an upper region 64 defining the quiescent zone and occupying the rest of the volume of vessel 60. In the preferred embodiment, base 61 has a diameter of between about 4 to about 6 inches and lower region 62 has a height of about 6 inches. The ratio of the diameter of top 62 to the diameter of the vessel 60 at point 69 is generally about 2:1.

The turbulent zone is created by the impeller 70, which has a shaft 72 and two propellers 74 and 76 each having a diameter of between about 2½ to about 4¾ inches. It is to be understood that one or more propellers may be utilized within the scope of this invention. Shaft 72 is attached to a conventional motor 78, located above vessel 60, and extending from motor 78, through a port 77 in rim 63, to a point P adjacent orifice 50. Motor 78 should have the capacity to rotate shaft 72, and consequently the blades of propellers 74 and 76, between about 900 to about 2000 rpm. Propeller 74 is located at the bottom of shaft 72 at point P, while propeller 76 is located on shaft 72 approximately four to six inches from base 61. It has been found that the addition of propeller 76 increases the viscosity of the resulting liquid. Both propellers 74 and 76 operate within the turbulent zone or lower region 62 and blades of propellers 74 and 76 creates the turbulence into which the polymer emulsion and the water are charged.

When the mixture enters vessel 60 from orifice 50, the pressure of the mixture drops to approximately one pound per square inch. Upon entering vessel 60, the emulsion is violently agitated in the vicinity of the blades of propeller 74. It is believed that at that point the water molecules and polymer materials are in intimate contact and the polymer begins to dissolve in the water. The mixture in the vicinity of the propellers 74 and 76 is driven downward by the force of the blades of the respective propellers, but this downward force is overcome by the upward displacement force of additional mixture charged through orifice 50 into vessel 60. The mixture is directed out of the turbulent zone by the walls of vessel 60 into the relatively quiescent zone or upper region 64.

Within the quiescent zone, the liquid becomes a highly viscous liquid. The velocity of the liquid decreases in the absence of violent agitation which is created by the propellers 74 and 76. It is important that the polymer-water admixture is not violently agitated after the constituent is withdrawn from the turbulent zone so that a highly viscous liquid can form. The resulting highly viscous liquid has a viscosity between about 100 CPS and 5000 CPS.

A bulk tank 90 serves as a holding reservoir for the resulting liquid produced within vessel 60 and is connected thereto by a line 80 which permits transfer of the liquid to bulk tank 90. The polymer-water liquid is stored in bulk tank 90 for later use or may be transferred to other containers.

The following illustrative example is set forth to better facilitate the understanding of this invention and is not intended to limit the scope thereof.

EXAMPLE 1

The process of the subject invention was carried out by initially placing in the polymer storage tank the following amounts of constituents: 33 volume percent polyacrylamide, 2 weight percent Prell, 33 weight percent kerosene, and 32 weight percent water. This material was thoroughly admixed to achieve a homogeneous state and then pumped into the mixing zone in an amount such that the admixture of the polymer emulsion and water produced a resulting liquid containing about 2 volume percent polymer material with water comprising the rest of the liquid. The mixture was charged into the turbulent zone at a pressure of about forty pounds per square inch through an orifice having a diameter of one-eighth of an inch. The mixing vessel had a turbulent zone with a diameter of 6 inches and a height of 6 inches while the quiescent zone had a top diameter of 10 inches and a height of 4 feet. Within the turbulent zone the mixture was violently agitated by two propellers rotating at about 1725 RPM. The mixture was then driven upward into the quiescent zone and transferred to the bulk tank where the highly viscous liquid was produced at a rate of 200 gallons per hour.

While this invention has been described in relation to a preferred embodiment, it is to be understood that various modifications thereof will be apparent to one skilled in the art upon reading the specification, and it is intended to cover such modifications as fall within the scope of the appended claims.

What is claimed is:

1. A process for dissolving a high molecular weight polymer in water to form a highly viscous liquid having a viscosity ranging from about 100 centipoises to about 5,000 centipoises; which process comprises the steps of:
   (a) admixing water with an emulsion containing said polymer;
   (b) charging the resulting admixture at a pressure ranging from about 15 to about 300 psi through an orifice that restricts the cross-sectional area of flow of said admixture;
   (c) discharging the admixture into a turbulent zone having a pressure of about 1 psi;
   (d) agitating the admixture within said turbulent zone by at least one impeller means; and thereafter
   (e) withdrawing the liquid thus formed from the turbulent zone.

2. The process of claim 1 wherein the polymer constituent of the polymer emulsion consists of high molecular weight, long chain polymers selected from the group consisting of polyacrylamide, carboxymethylcellulose, and guar gum.

3. The process of claim 1 therein said admixture is charged through an orifice with a diameter ranging from about one-sixteenth to about one-half inch.

4. The process of claim 1 wherein said admixture is charged at a pressure ranging from about 70 to about 100 psi through an orifice that restricts the cross-sectional area of flow of said admixture.

5. A process for dissolving a high molecular weight polymer in water to form a highly viscous liquid having a viscosity ranging from about 100 centipoises to about 5,000 centipoises, which process comprises the steps of:
   (a) admixing water with an emulsion containing said polymer;
   (b) charging the resulting admixture at a pressure ranging from about 15 to about 300 psi through an orifice that restricts the cross-sectional area of flow of said admixture;
   (c) discharging the admixture into a turbulent zone having a pressure of about 1 psi;
   (d) agitating the admixture within said turbulent zone by at least one impeller means; and thereafter
   (e) directing the liquid thus formed through the turbulent zone to a quiescent zone to permit the formation of said highly viscous liquid.

6. The process of claim 5 wherein the polymer constituent of the polymer emulsion consists of high molecular weight, long chain polymers selected from the group consisting of polyacrylamide, carboxymethylcellulose, and guar gum.

7. The process of claim 5 wherein said admixture is charged through an orifice with a diameter ranging from about one-sixteenth to about one-half inch.

8. The process of claim 5 wherein said admixture is charged at a pressure ranging from about 70 to about 100 psi through an orifice that restricts the cross-sectional area of flow of said admixture.

* * * * *